C. H. BIRCH.
CAN CAPPING OR DISK FEEDING MACHINE.
APPLICATION FILED MAR. 14, 1916.

1,387,461. Patented Aug. 16, 1921.
8 SHEETS—SHEET 1.

Witnesses:
E. H. Lindstrom
C. A. Homer

Inventor
Charles H. Birch
per Burton J. Hills
Attorney

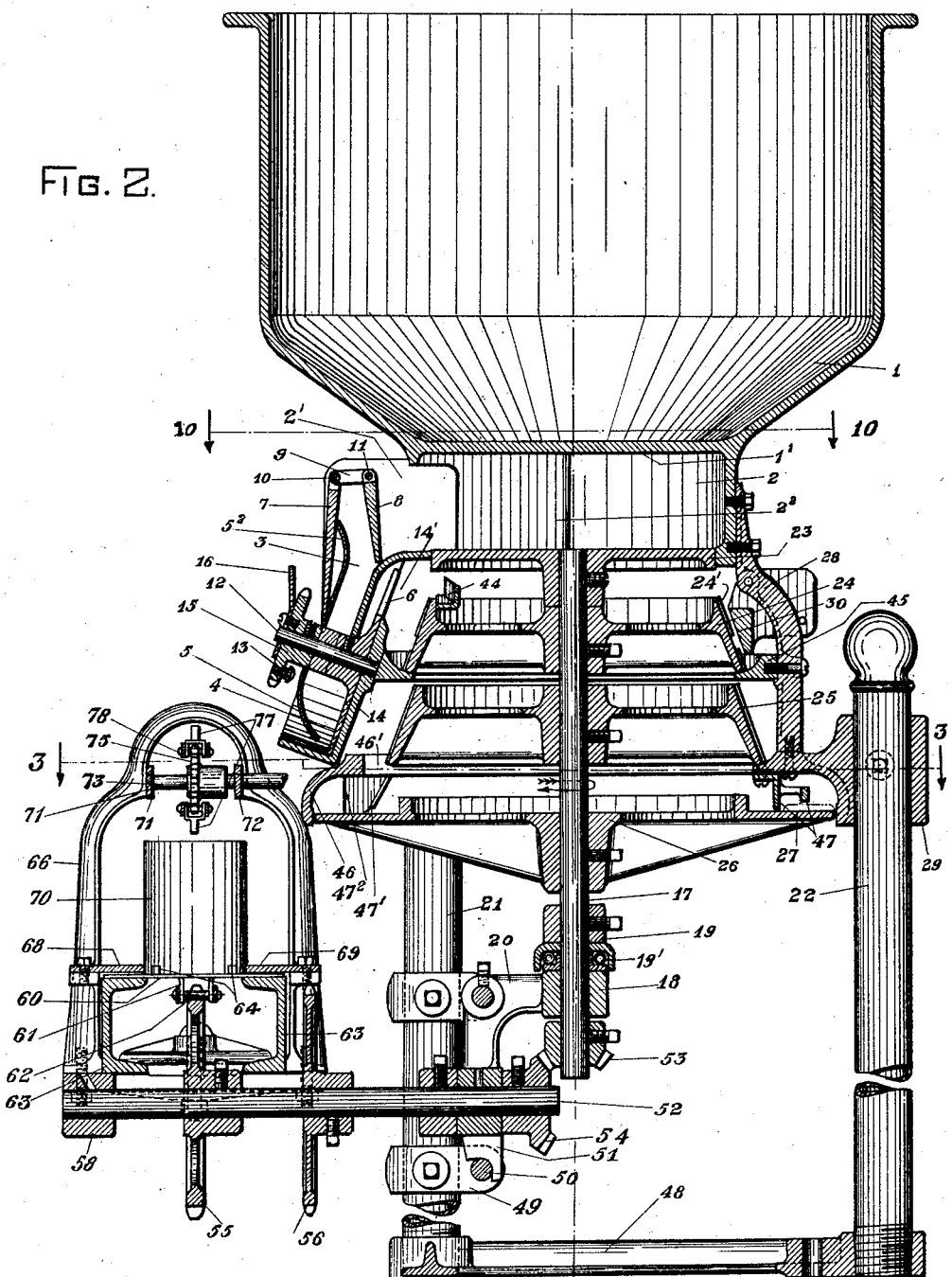

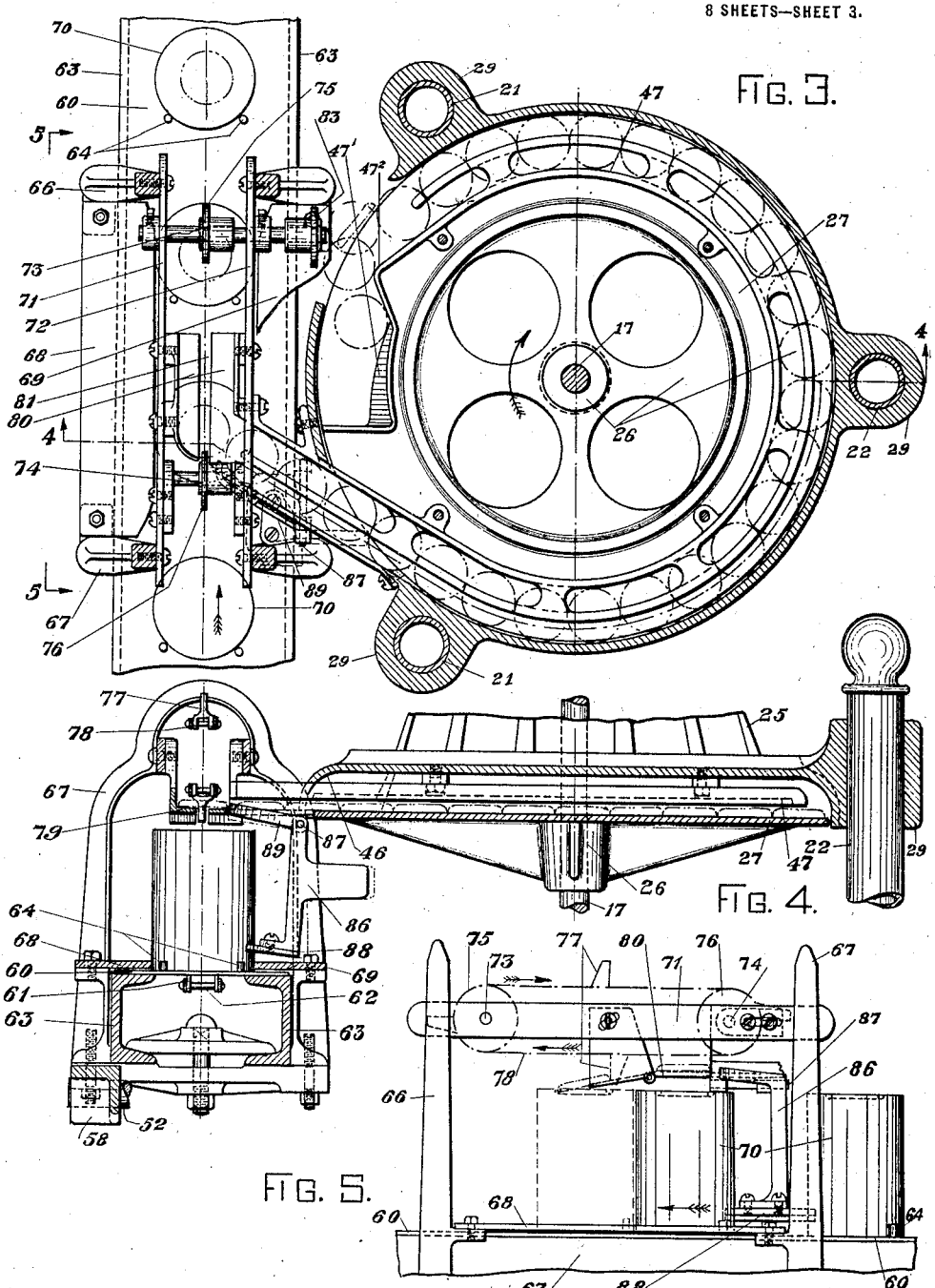

C. H. BIRCH.
CAN CAPPING OR DISK FEEDING MACHINE.
APPLICATION FILED MAR. 14, 1916.

1,387,461.

Patented Aug. 16, 1921.
8 SHEETS—SHEET 4.

Witnesses:
E. W. Lindstrom
C. A. Horner

Inventor
Charles H. Birch
per Burton W. Hills
Attorney

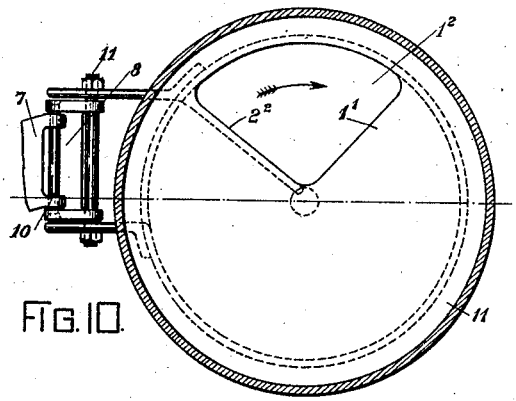
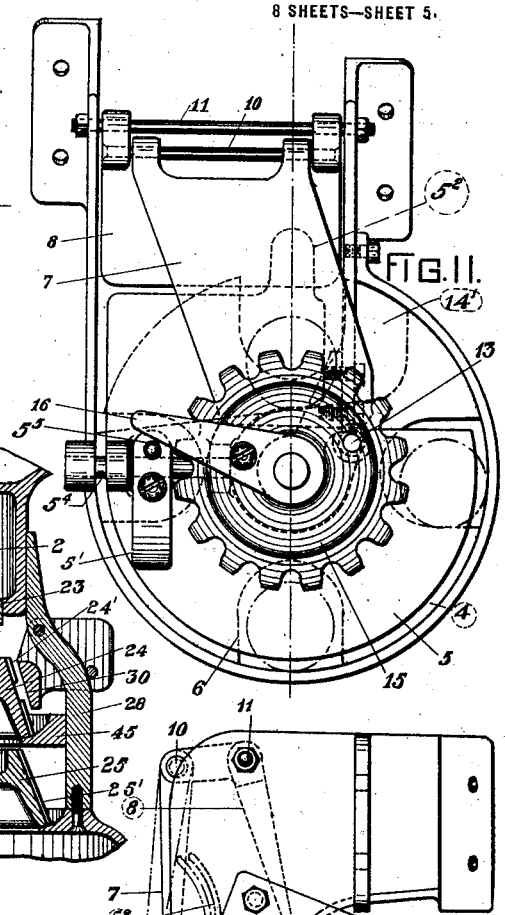
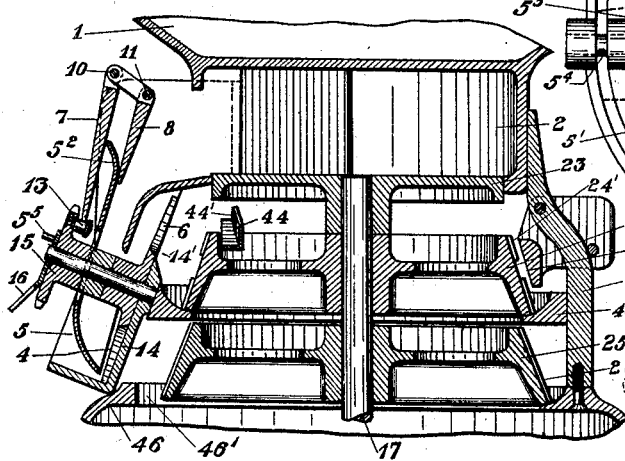
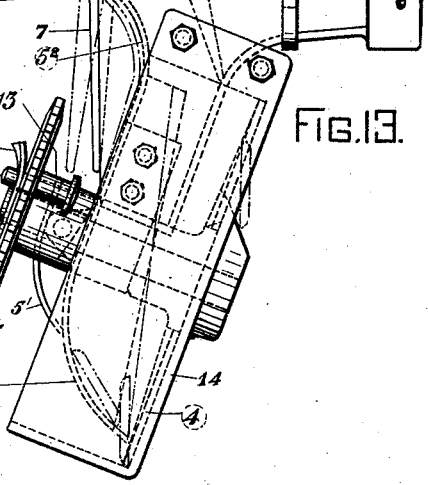
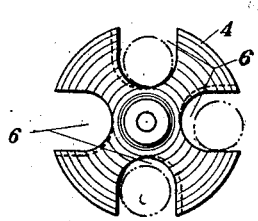
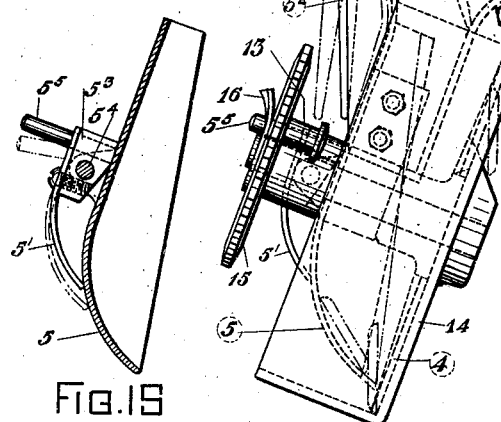

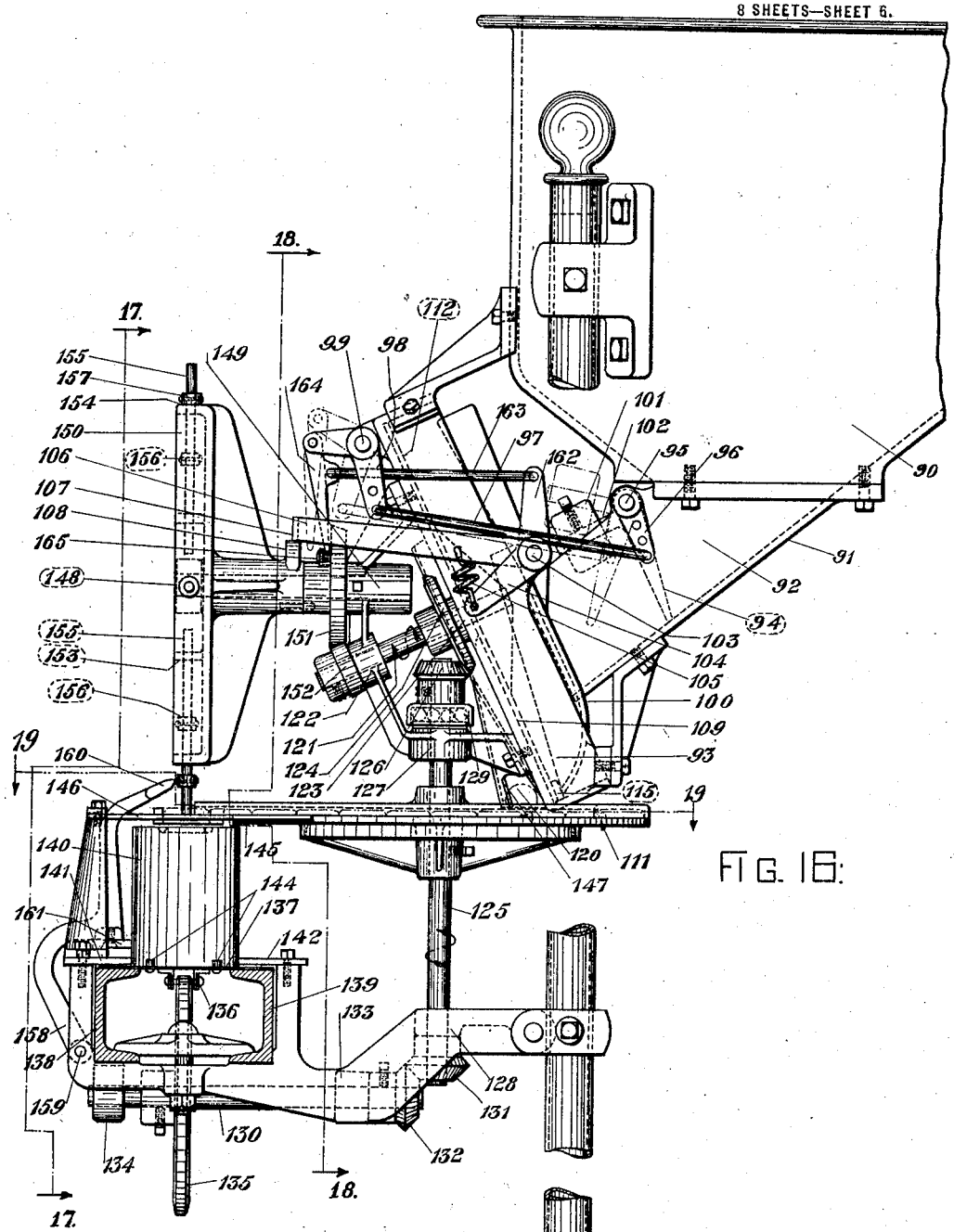

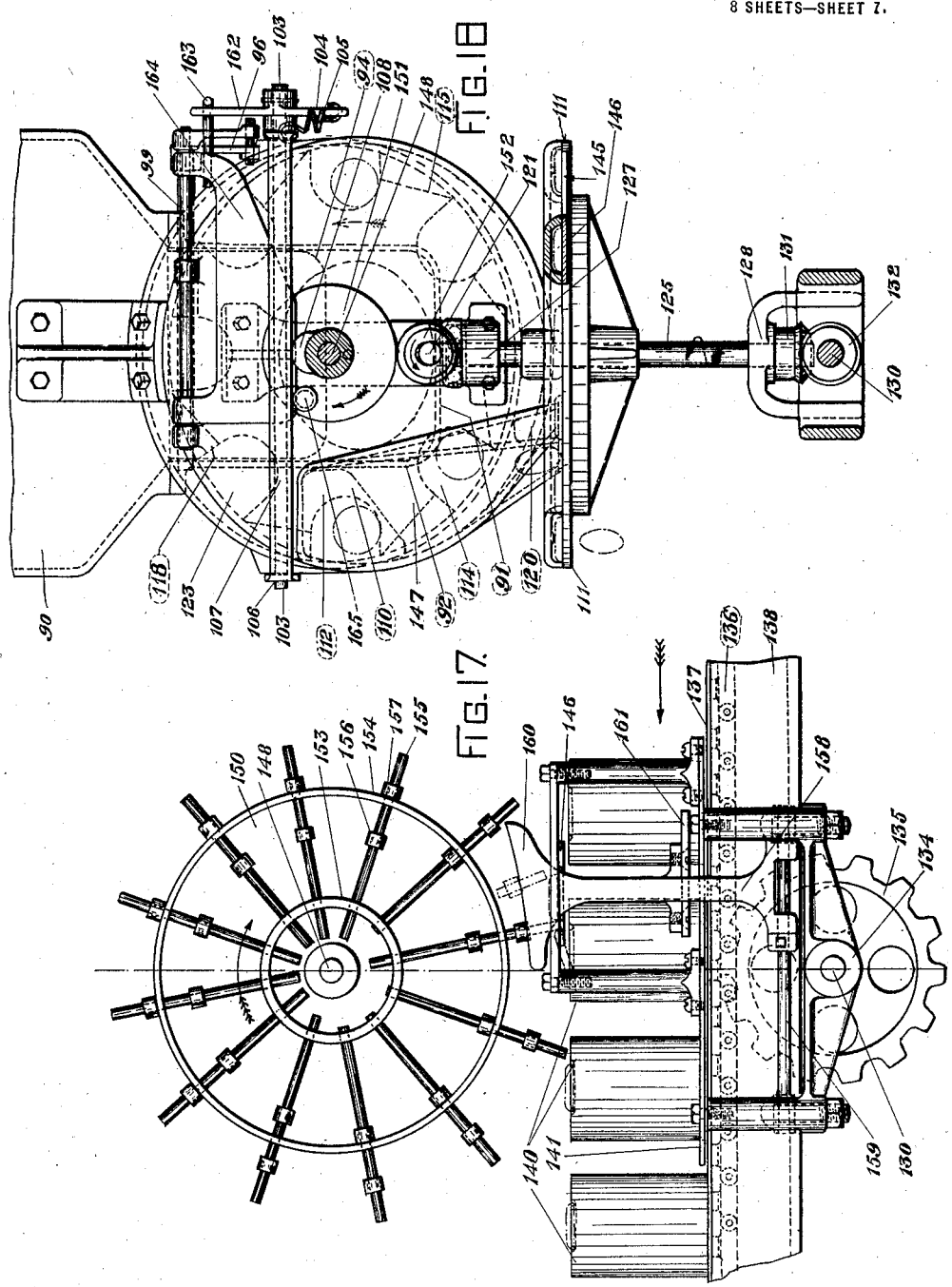

UNITED STATES PATENT OFFICE.

CHARLES H. BIRCH, OF CHICAGO, ILLINOIS.

CAN-CAPPING OR DISK-FEEDING MACHINE.

1,387,461. Specification of Letters Patent. Patented Aug. 16, 1921.

Application filed March 14, 1916. Serial No. 84,039.

*To all whom it may concern:*

Be it known that I, CHARLES H. BIRCH, a citizen of the United States, residing at Chicago, in the county of Cook and State of Illinois, have invented certain new and useful Improvements in Can-Capping or Disk-Feeding Machines, of which the following is a description.

My invention relates to mechanism for automatically feeding and placing in position small disks or other objects formed of any material such for example, as the cap or closure for metal cans employed for hermetically sealing and preserving fruit, vegetables and other substances.

The object of my invention is to provide a simple, accurate and reliable device of the kind described adapted to receive the can caps or other articles in any quantities and automatically placing the same one by one in position upon the filled cans, containers or other article or thing.

To this end my invention consists in the novel construction, arrangement and combination of parts herein shown and described and more particularly pointed out in the claims.

In the accompanying drawings wherein like or similar reference characters indicate like or corresponding parts:

Fig. 2 is a central vertical section taken substantially on line 2—2 of Fig. 1.

Fig. 3 is a horizontal section taken substantially on line 3—3 of Fig. 2.

Fig. 4 is a section taken substantially on line 4—4 of Fig. 3.

Fig. 5 is a view showing the method of finally placing the caps in position upon the cans.

Fig. 10 is a section taken substantially on line 10—10 of Fig. 2.

Fig. 11 is an enlarged front elevation of the feed box.

Fig. 12 is a partial section similar to Fig. 2 showing the feed valve open.

Fig. 13 is a side elevation of the feed box as shown in Fig. 11.

Fig. 14 is a detail of the feeding disk.

Fig. 15 is a sectional detail of the movable side of the feed box.

Fig. 16 is a side elevation of a modified form of my device.

Fig. 17 is a front elevation of the front portion only of my device as seen from line 17—17 of Fig. 16.

Fig. 18 is a section taken substantially on line 18—18 of Fig. 16.

Figure 1:
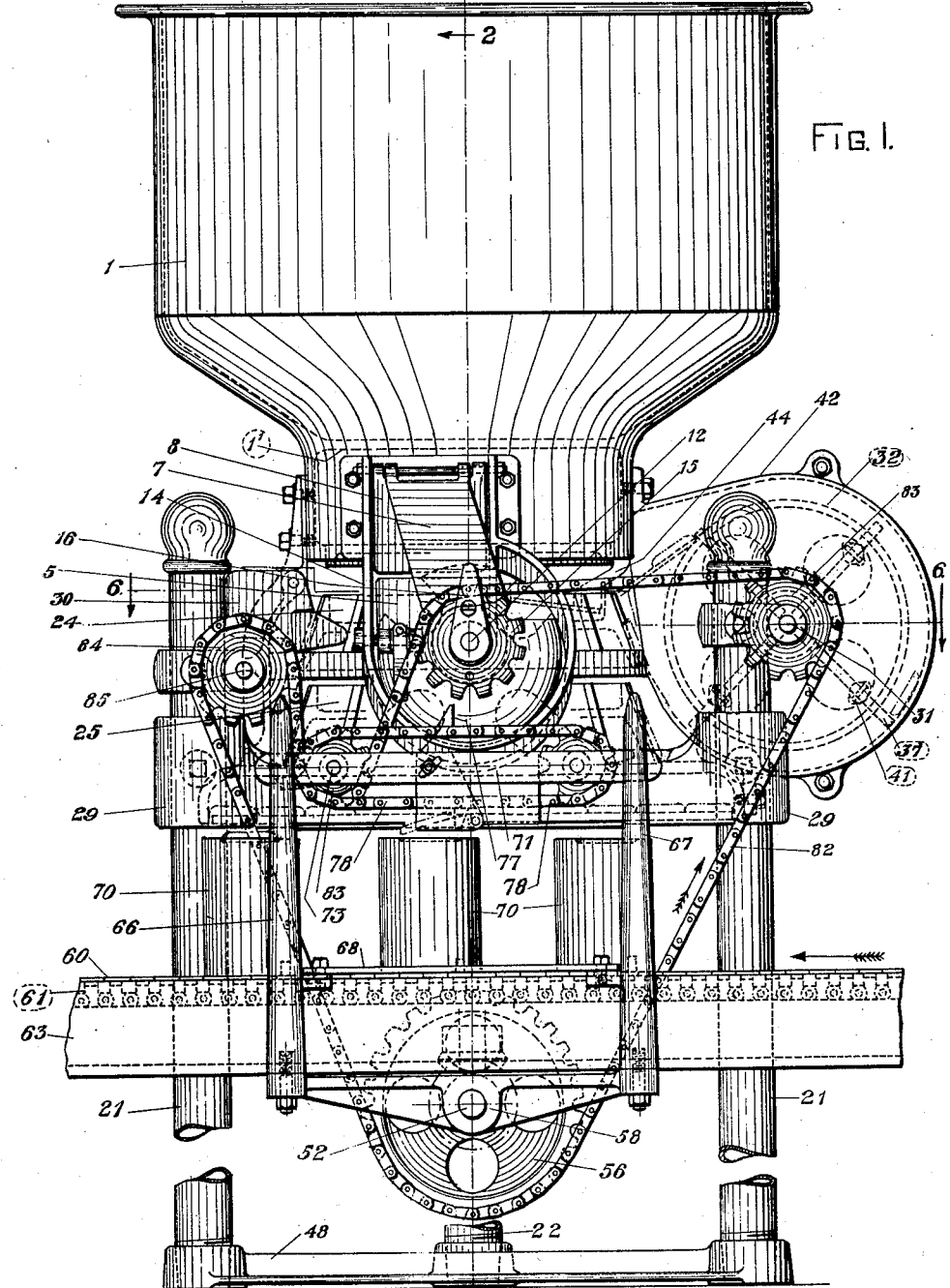
Figure 1 is a front elevation of my device.
Figure 6:
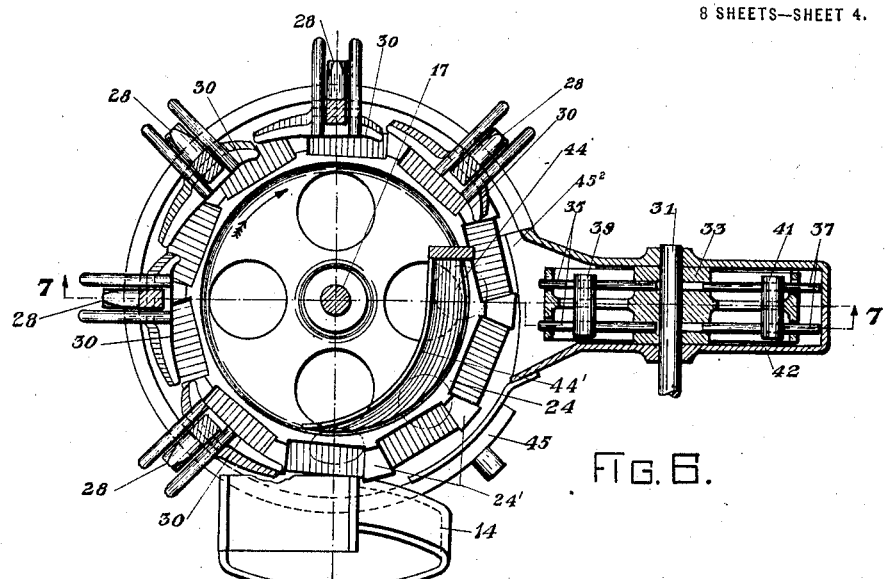
Fig. 6 is a transverse section taken substantially on line 6—6 of Fig. 7.

In the form shown in the drawings my device comprises a suitable container 1 adapted to receive any desired quantity of the articles, in the form shown, can caps which it is desired to place in position upon cans. A partition 1' (see Fig. 2) extends across the lower part of the container having an opening 1² (Fig. 10) therethrough for permitting a portion of the caps in the container to pass into the chamber 2 (Fig. 2) at the bottom of the container whence they pass into the feed box 3 adapted to regularly deliver the caps to the succeeding portion of the mechanism.

In the preferred construction a rotatable member 4 (see Figs. 2, 12, 13 and 14) is positioned in one side of the feed box while a movable side or partition 5 forms the opposite side, the movable side 5 is preferably slightly curved at its lower end to direct the caps entering the feed box against the member 4 which in the preferred construction is slightly inclined as shown and provided with a plurality of apertures 6—6 each adapted to receive a cap so that when the member 4 is rotated the walls of the apertures 6 will successively engage the caps positioned in the feed box and carry them upward until they fall by gravity through the opening 14' at the top of the stationary wall 14.

Any suitable means may be provided to control the escape of the caps from the chamber 2 into the feed box. As shown a valve 8 is pivotally mounted at the discharge opening 2' so that when the valve is in the position shown in Fig. 2 the caps are retained in the chamber 2. When however the number of caps between the member 4 and movable side 5 is sufficiently reduced to require replenishing the lower end of the partition 5 moves inward under the pressure of the spring 5' (see Figs. 11, 13 and 15) while the upper end $5^2$ moves the arm 7 outward until its lower edge is engaged by the pin 13 projecting from the sprocket wheel 15 or other rotatable portion of my device. When this occurs the arm 7 is raised at each rotation of the sprocket wheel thus raising the outer end of the lever 9 to which the arm 7 is attached as at 10 and swinging the lower side of the valve 8 which is pivoted at its upper edge as at 11 to the framework of my device, outward and permitting a fresh supply of caps to enter the feed box. In the preferred construction shown in Figs. 11, 12, 13 and 14 the spring 5' is rigidly secured to a block $5^3$ which is in turn pivotally attached to the movable side 5 as at $5^4$ and a projecting pin $5^5$ is provided upon the block $5^3$ with its free end extending into the path of a spring 16 attached to the sprocket wheel 15 and extending radially therefrom so that at each rotation of the sprocket wheel 15 the lower edge of the movable side 5 is resiliently forced toward the stationary wall 14 of the feed box. As soon as a sufficient quantity of the caps have entered the feed box the lower portion of the movable side 5 is forced outward slightly and held in its outward position by their pressure or weight thus retracting the part $5^2$ from the arm 7 and permitting the arm to swing inward by gravity out of the path of the stud 13 and moving the valve 8 to close the opening 2' and prevent a further escape of the caps from the chamber 2.

Any suitable means may be provided for gradually moving the caps in the chamber 2 toward the discharge opening 2'. As shown a vertical shaft 17 is provided substantially central to the chamber 2 and container 1 and rotatably supported by a suitable bearing 18 or other convenient means (see Fig. 2) rigidly mounted upon the frame of my device. A collar 19 is rigidly secured to the shaft 17 immediately above the upper end of the bearing 18 with suitable balls 19' or other anti-friction mechanism interposed between the faces of the collar and the end of the bearing to carry the weight of the shaft and the several parts secured thereto. A disk 23 is rigidly attached to the shaft 17 near its upper end, the upper surface of the disk being preferably substantially flat and positioned to serve as the bottom or floor of the chamber 2 so that any caps entering the chamber 2 will rest directly upon the upper surface of the disk 23. When the shaft 17 is rotated in the direction indicated in Fig. 10 the caps will be carried by the disk around the chamber 2 until they reach the wall $2^2$ extending radially of the disk from the partition 1' downward into close proximity to the face of the disk, the caps upon reaching this wall gradually move outward into the discharge opening 2' so that as soon as the valve 8 is opened the caps will immediately fall into the feed box.

A member 24 is also rigidly mounted upon the shaft 17 immediately below the disk 23 (see Figs. 2, 6, 7, and 12) the form of this member is preferably frusto-conical and a plurality of ribs or lugs 24' are provided upon its inclined surface suitably spaced from each other to receive a can cap between them so that when the caps escape through the opening 14' in the wall 14 of the feed box they will fall upon or into a stationary annular member 45 positioned at the lower edge of the member 24 and rigidly secured to the frame of my device, with the upper edge of each cap resting against the member 24. The several parts are preferably so constructed and arranged that as the member 24 continues to rotate the can caps resting jointly upon the annular member 45 and member 24 will each become positioned in one of the spaces between the lugs 24' and rest on its edge upon the annular member 45 and will finally reach a position flat against the face of the member 24.

Figure 7:
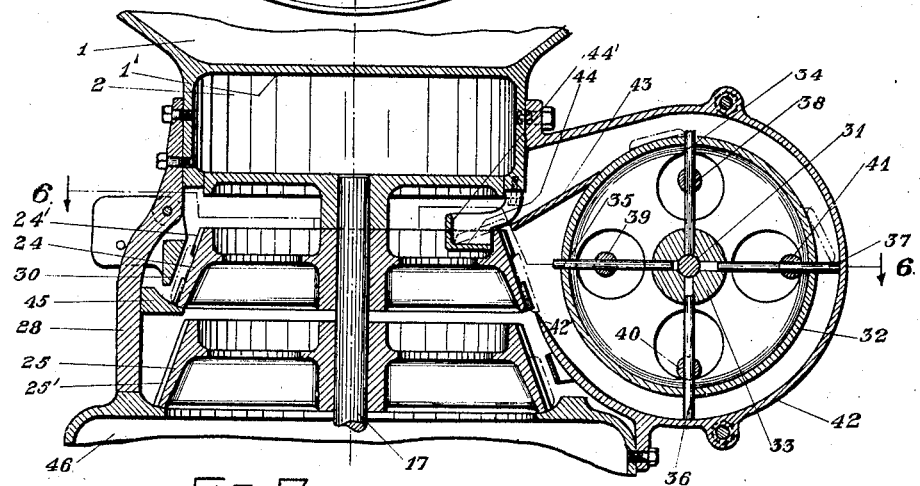
Fig. 7 is a fragmentary central vertical section of my device taken substantially on line 7—7 on Fig. 6.
Figures 8, 9:
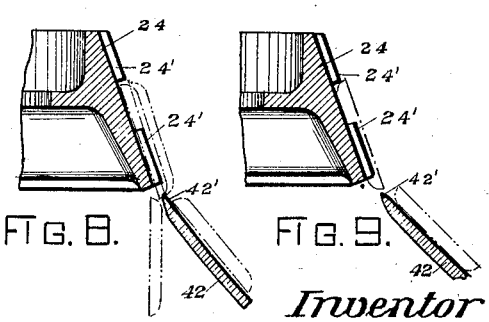
Figs. 8 and 9 are enlarged sectional details similar to corresponding portions of Fig. 7 showing a portion of the mechanism for separating nested caps and for disposing of caps reaching this portion of the machine wrong side up.
Figure 19:
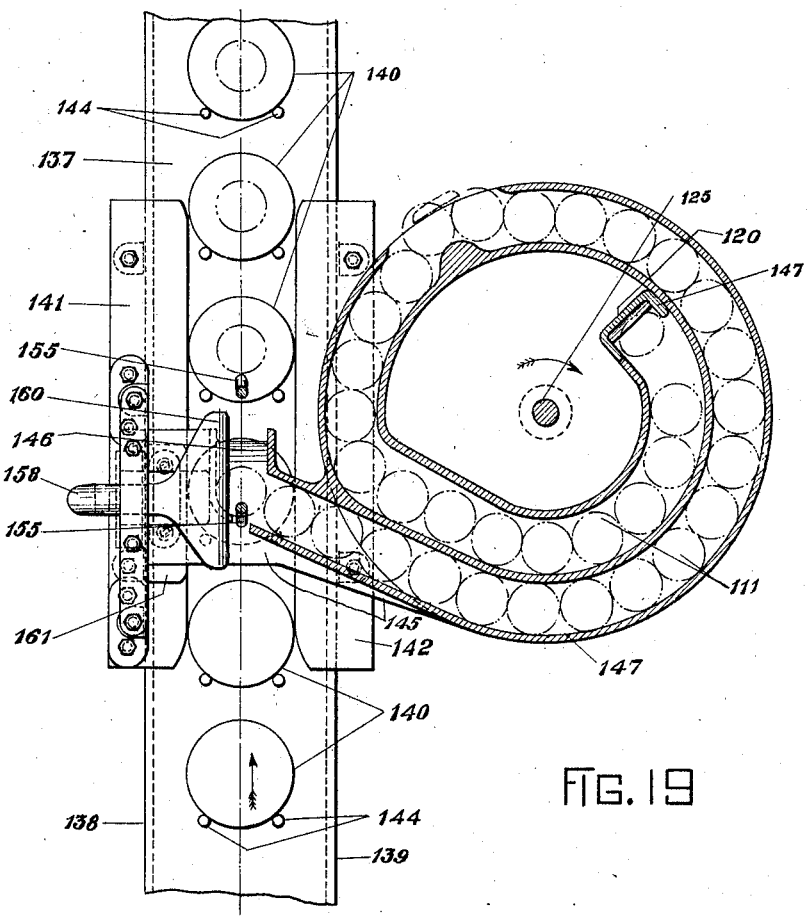
Fig. 19 is a section taken substantially on line 19—19 of Fig. 16.

In the preferred construction a casing 42 is rigidly secured to the frame of my machine as shown in Fig. 7 and the annular member 45 is interrupted as at $45^2$ at the casing. The upper edge of the part 42' of the casing is positioned substantially in the plane of the surface of the annular member 45 upon which the caps normally roll at this point so that when the can caps reach the opening $45^2$ they will be supported only by the edge of the part 42' of the casing 42. The part 42' is so formed and positioned that if a single can cap is resting with its convex side outward, that is with its concave side against the inclined surface of the member 24 it will pass between the member 24 and part 42' as shown in Fig. 8, if however, a plurality of nested can caps arrive in this position a single cap adjacent the member 24 only can escape while the remainder will slide into the casing 42 or if too firmly attached to each other they will pass across the interruption in the annular member 45 and continue to pass around the member 45 until they break after which the cap next adjacent the member 24 will escape as described, if however, a cap arrives at the interruption with the convex side adjacent the member 24 it will immediately pass into the casing 42 as shown in Fig. 9.

Any suitable means may be provided to remove the caps from the casing 42. As shown a rotatable shaft 31 extends transversely of the casing with a sheave 32 rigidly mounted thereon. A plurality of radial fingers 34, 35, 36 and 37 arranged in pairs as shown are slidably mounted in suitable bearings in the hub and rim respectively of the sheave 32 so that they will slide longitudinally by gravity and continuously sweep the bottom surface of the casing 42 and engage any can caps positioned in the casing and carry them up and over the top of the sheave and deliver them upon the inclined plate 43 extending from the surface of the sheave to a point adjacent the upper edge of the member 24. Any suitable means may be provided for connecting the fingers of each pair so that they will operate together in the casing. As shown a transverse tie 38, 39, 40 and 41 is provided for the respective pairs of fingers each extending through a suitable opening in the web of the sheave and rigidly secured in position upon the fingers. In the preferred construction an angular table 44 is provided within and slightly below the upper edge of the member 24 so that each can cap discharged from the casing 42 will rest upon the upper edge of the member 24 with one edge inclined downward and resting upon the table 44 which gradually decreases in width and is provided with an upward flange 44′ at its inner edge adapted to gradually force the caps resting jointly upon the table 44 and member 24 outward until they over-balance and slide into one of the pockets on the member 24 between the lugs 24′. It will be observed that this operation turns each cap over during its passage through the casing 42 so that if originally it was positioned with its convex side against the member 24 when it is again positioned at the face of the member 24 its convex side will be outward and it escapes through the space between the member 24 and part 42′.

In the form shown when the caps escape from the member 24 as described they fall upon a second annular member 46 arranged to coöperate with a rotatable member 25 similar in form to the member 24 and in substantially the manner hereinbefore described as each can cap falls upon the member 46 it enters a space between the lugs 25′ upon the member 25 and is thereby carried around the member 46 until it reaches an opening 46′ where it escapes and falls upon a table 26 also attached to the shaft 17 and rotating therewith. A suitable guide 47 is rigidly attached to the member 46 and extends downward into close proximity to the table 26 for controlling the position of the can caps upon the table. The guide 47 preferably comprises an inclined portion 47′ at the opening 46′ (see Fig. 3) so that each can cap passing through the opening will slide down the inclined surface 47′ onto the table 26 arriving upon the table with its concave side downward when in this position a part $47^2$ of the guide is encountered by the can cap which forces the cap outward toward the periphery of the table into position to enter the space between the annular walls of the guide 47 and pass around the table to the discharge end of the guide; if however the space between the walls of the guide 47 is already filled each succeeding cap upon encountering the cap at the entrance of this portion of the guide will be merely forced over the edge of the table as shown in Fig. 3.

Any suitable means may be provided to successively place can caps in position upon the cans. As shown a substantially horizontal conveyer is provided for moving the cans in a predetermined path adjacent the above described portions of my device comprising a flexible band or belt 60 adapted to receive the cans 70 on its upper surface. A plurality of downwardly projecting pairs of lugs or teeth 61 are rigidly secured to the underside of the band along each side of its center and uniformly spaced from each other. A bolt or pin 62 extends between the lugs of each pair adapted to coöperate with the teeth of a sprocket wheel 55 or other suitable means arranged to engage the pins 62 and insure the accurate coördination of movement between the band and the sprocket wheel. The wheel 55 is mounted on a suitable horizontal shaft 52 which is in turn rotatably mounted in a bearing 58 rigidly attached to one of the channel bars 63 which serve as guides and supports for the band 60. A bearing 51 is also provided for the shaft 52 upon the bracket 20 rigidly mounted upon the posts 21 of the frame of my device thus connecting the adjacent ends of the shafts 17 and 52 and insuring proper coöperation between the bevel gears 53 and 54 mounted upon their respective ends for rotatively connecting shafts together.

In the preferred construction suitable means are provided for accurately locating the cans 70 upon the band 60. As shown a pair of lugs or projections 64—64 are provided at regular intervals upon the upper surface of the band at each side of its center line so arranged as to engage the circular bottom of the can and accurately locate the same both longitudinally and transversely of the band. In the preferred construction also a pair of upwardly projecting brackets 66 and 67 are rigidly secured to the channel-bars 63—63 adjacent the main frame of my device and a pair of guide plates 68 and 69 are rigidly secured to the brackets 66 and 67 substantially parallel to the upper surface of the respective channel bars and just at the upper surface of the band 60. The adjacent edges of the plates are substantially parallel to each other and suitably spaced to permit the cans to pass between them while accurately controlling their lateral position. A pair of bars 71 and 72 are also rigidly secured to the upper portion of the brackets 66 and 67 also substantially parallel to each other and to the band 60. A pair of shafts 73 and 74 are rotatably mounted in suitable bearings upon the bars 71 and 72 and sprocket wheels 75 and 76 are mounted upon the shafts 73 and 74 respectively; the several parts being so positioned and arranged that the free ends of the projecting fingers 77 upon the sprocket chain 78 which is mounted upon the wheels 75 and 76 will just clear the upper ends of the cans 70 positioned on the band 60. A plate 79 is also rigidly attached to the bars 71 and 72 with its upper surface substantially in the plane of the plate 27 and extends above the upper ends of the cans 70. The discharge end of the guide 47 extends along the plate 79 and terminates in a portion 80 between the bars 71 and 72 extending longitudinally of and parallel with the band 60. A slot 81 is provided through the plate 79 to permit the fingers 77 to project therethrough so that can caps passing along the guide 47 will successively arrive in the part 80 where they will be engaged by the fingers 77 and ejected therefrom and placed in the desired position upon the tops of the passing cans upon the band 60.

Any suitable means may be provided to operate the several portions of my device to synchronously perform their respective functions. In the form shown a sprocket wheel 56 is rigidly secured to the shaft 52 and connected by a sprocket chain 82 to a sprocket wheel 83 upon the shaft 31 thence the chain 82 extends to and engages the sprocket 15 upon the shaft 12 after which it passes below the sprocket wheel 83 upon the shaft 73 thence over an idler 84 rotatably mounted upon a stud 85 upon the frame of my device and thence downward to the wheel 56 so that a movement of the band 60 will produce a corresponding movement of the several portions of my machine. The sprocket chain 78 is so timed and the fingers 77 so positioned that as each can 70 passes beneath the part 80 of the guide 47 a finger 77 will move along the slot 81 in the proper relation to the can to place a can cap positioned in the guide in any desired position upon the can when the can and can cap arrive at the end of the guide.

In the preferred construction suitable means are provided to prevent the discharge of a can cap into the portion 80 of the guide when no can is positioned upon the band 60 to receive it. As shown an arm 86 is pivotally mounted upon the plate 79 as at 87 and extends downward to a point near the band 60 where a plate 88 is provided to normally project beyond the plate 69 so that as each can enters the space between the plates 68 and 69 it will engage the plate 88 and swing the lower end of the arm 86 outward. A finger 89 is rigidly secured to the upper end of the arm 86 with its free end normally projecting into the guide 47 near the slot 81 and adapted to engage a can cap at the point where it enters the part 80 and arrest its forward movement; when however the lower end of the arm 86 is moved outward as above described by a can upon the band 60 the free end of the finger 89 is depressed below the upper surface of the plate 79 permitting the can cap to escape into the path of the fingers 77. The several parts are so proportioned and arranged that before the can cap last entering the portion 80 of the guide is removed from its initial position the can to which it belongs will have passed the plate 88 thus permitting the arm 86 and finger 89 to return to their normal positions and prevent the next succeeding can cap from passing into the portion 80 until another can upon the band 60 engages the plate 88.

In the form shown in Figs. 16 to 19 the container 90 is provided with an inclined bottom 91 adapted to automatically discharge the can caps from the container through the inlet opening 92 into the receptacle 93 the valve 94 is rigidly secured to the shaft 95 and extends across the spout between the outlet opening and the receptacle 93. An arm 96 is rigidly secured to the shaft 95 and connected by a rod to an arm 98 upon a shaft 99. A weight 101 is provided upon a projecting finger 102 upon the valve 94 to normally hold the valve in closed position. A curved plate 100 is positioned in the receptacle 93 and rigidly attached at its upper end to a shaft 103 rotatably mounted upon the side walls of the receptacle. An arm 104 is also rigidly attached to the shaft 103 and connected by a spring 105 to a lever 106 loosely mounted upon the shaft 103 and having a part 107 connecting across the face of my device adapted to coöperate with a lug 108 upon a rotating portion of my device to periodically raise the free end of the arm 106 and thereby resiliently draw the plate 100 to the limit of its movement into the receptacle. The rear wall 109 of the receptacle 93 is preferably inclined substantially as shown and provided with an opening 110 (see Fig. 18) and a chute 120 extends from the opening 110 downward to a rotatable platform 111. A rotatable disk 112 is also positioned in the receptacle 93 with one flat side normally in contact with the wall 109. The disk is preferably provided with a plurality of apertures 114 in its periphery (see Fig. 18) each adapted to periodically register with the opening 110 when the disk is rotated.

The walls of the several apertures 114 are preferably so formed that they will each receive a single can cap and retain the same in position if the can cap is positioned with its concave face adjacent the wall 109 but in case the convex side of the can cap is adjacent the wall 109 the disk will merely slip behind the can cap without materially elevating the same also when a plurality of nested caps are positioned in an aperture with their concave side adjacent the wall 109 they will be engaged and slightly elevated by the face 116 of the projections 115 but as soon as the face 116 is inclined sufficiently from the peripheral wall of the receptacle, that is shortly after it passes the horizontal center line of the disk the caps will roll off the face and fall back upon the caps in the receptacle the impact of the fall tending to break the nested caps apart.

Obviously each can cap retained in an aperture will be carried by the disk 112 until the aperture registers with the opening 110 when the cap slips through into the chute 120 and slides down the wall of the chute onto the platform 111 where it is positioned with its concave side downward.

Suitable means are provided for rotating the disk 112 and supporting the same in position. As shown a shaft 121 is rotatably mounted in suitable bearings 122 and 123 upon the frame of my device and the wall 109 respectively, and the disk 112 is rigidly secured to the end of the shaft 121. A gear 124 is also rigidly secured to the shaft 121 and coöperates with a gear 126 upon the upright shaft 125 upon which the platform 111 is mounted. The shaft 125 is rotatably mounted in suitable bearings 127 and 128 in the frame of my device and provided near its upper end with a roller thrust bearing 129 for supporting the shaft and platform 111. A second gear 131 is rigidly secured to the lower end of the shaft 125 and coöperates with a gear 132 upon a horizontal shaft 130 also mounted in suitable bearings 133 and 134 upon the frame of my device.

A sprocket wheel 135 is rigidly secured to the shaft 130 and coöperates with suitably formed engaging members 136 upon the bottom side of a flexible band or belt 137. In the preferred construction a pair of channel bars 138 and 139 are mounted in a substantially horizontal position and rigidly secured to the frame of my machine in position to support the band 137 on their upper faces. A pair of plates 141 and 142 are rigidly attached to suitable portions of the frame work of my device slightly above and substantially parallel to the band 137 and adapted to engage the sides of the cans 140 positioned upon the band 137 and accurately controlling their lateral position upon the band 137 as well as insuring their contact with the lugs or projections 144 upon the upper surface of the band thus accurately controlling the position of the can both longitudinally and transversely upon the band.

In the preferred construction a stationary table 145 extends from the platform 111 to a point slightly beyond the center line of the cans upon the band with a part 146 extending substantially parallel with the center line of the band and a stationary guide 147 extends from the chute 120 around the platform 111 and along the table 145 and 146 so that the caps discharged from the chute 120 onto the platform 111 will be directed by the guide 147 to a point at the center-line of the cans upon the band 137.

Any suitable means may be provided for removing a cap from the table 146 and placing the same in position upon a passing can. As shown a shaft 148 is rigidly mounted upon the frame of my device as at 149 and a sheave 150 is rotatably mounted upon the shaft 148 with a gear 151 rigidly attached to the hub thereof and meshing with a gear 152 upon the shaft 121 to rotate the sheave and a pair of annular bands 153 and 154 are provided at the face of the sheave 150 provided with a plurality of radial alined openings. A plurality of longitudinally movable pins or bars 155 are positioned in said openings each having a pair of collars 156 and 157 rigidly secured thereto. The collars 156 are positioned to engage the band 154 to limit the outward movement of the pins while the collars 157 are arranged to limit the inward movement of the bands and also to coöperate with means for raising the pins and preventing their engagement with a can cap upon the table 146 when no can is positioned upon the band 137 to receive the cap. For this purpose an arm 158 is pivotally mounted upon the frame of my device as at 159 and provided with a transverse blade 160 adapted to normally project in the path of the collars 157 and operate as a cam to raise each pin as the collar positioned thereon engages the blade 160 thus preventing the pins from engaging the caps upon the table 146, a plate 161 is also rigidly attached to the arm 158 in position to engage the lower portion of each can 140 as it enters the space between the bars 141 and 142 and operate as a cam to swing the free end of the arm outward thus moving the blade 160 out of the path of the collars 157 and permitting them to successively engage the caps upon the table 146 and sweep them over the end of the table on to the open end of the can. The several parts are so positioned and arranged that the pins 155 will successively push the caps one by one from the end of the table at the moment that cans on the band 137 reach a position to receive the cap. In the form shown the lug 108 is formed upon the hub of the sheave 150 and at each rotation of the sheave the free end of the arm 106 is raised tending to move the plate 100 inward toward the wall 109. So long as a sufficient quantity of the can caps are in the receptacle, the plate 100 will be held away from the disk 112 in the receptacle 93 when however the caps in the receptacle become exhausted the plate will enter into the receptacle sufficiently to cause the arm 162 to move the arm 164 to which it is connected by the rod 163 toward the gear 151 until the pin 165 on the gear engages the lower end of the arm 164 thus rocking the shaft 99 and thereby moving the arm 98, rod 97 and arm 96 to open the valve 94 and permit a fresh supply of can caps to enter the receptacle.

While in the foregoing specification I have described my device in connection with mechanism, especially adapted for placing circular caps on cylindrical cans it is obvious that substantially the same mechanism may be employed for feeding various parts to be automatically assembled such as can or box covers to the body portion, or for cookies or candies to be assembled with other articles, the changes necessary for each specific article being obvious from the form, size and nature of the object.

Having thus described my improvement, it is obvious that various immaterial modifications may be made in my device without departing from the spirit of my invention, hence, I do not wish to be understood as limiting myself to the exact form or construction shown.

What I claim as new and desire to secure by Letters Patent is:

1. In a disk feeding machine of the kind described, a container adapted to receive a plurality of similar articles and having a discharge opening at its bottom and a receptacle arranged to receive said articles escaping through said opening, in combination with a valve for controlling said opening and means for controlling the operation of said valve by the amount of said articles in said receptacle, comprising a member operatively connected with the valve, means for positively actuating said member, and means in the receptacle for moving said member into operative relation with the said actuating means.

2. In a disk feeding machine of the kind described, a container adapted to receive a plurality of similar articles and having a discharge opening at its bottom, mechanism at said bottom for regulating the discharge of said articles through said opening and a receptacle arranged to receive the articles escaping through said opening, in combination with a valve for controlling said opening and means for controlling the operation of said valve by the number of said articles in said receptacle, comprising a member operatively connected with the valve, means for positively actuating said member to operate the valve and means in the receptacle for moving said member into operative relation with said actuating means upon the partial emptying of the receptacle.

3. In a disk feeding device of the kind described, a container adapted to receive a plurality of similar articles and having a discharge opening at its bottom, a movable plate at said bottom for regulating the discharge of said articles through said opening and a receptacle arranged to receive the articles escaping through said opening, in combination with a valve for controlling said opening and automatically operable means for controlling the operation of said valve by the number of said articles in said receptacle, whereby a plurality of articles are at all times contained in the receptacle.

4. In a disk feeding device of the kind described, a container adapted to receive a plurality of similar articles and having a discharge opening at its bottom and a receptacle having an inclined wall arranged to receive said articles escaping through said opening, in combination with a valve for controlling said opening and means coöperating with said inclined wall for controlling the operation of said valve by the amount of said articles in said receptacle, including a movable member substantially constituting a wall of the receptacle and coöperating mechanism connected with the valve.

5. In a device of the kind described, a container adapted to receive a plurality of similar articles and having a discharge opening at its bottom, a receptacle arranged to receive said articles escaping through said opening, and a movable member extending into said receptacle for regularly removing said articles from said receptacle, in combination with a valve for controlling said opening and means for controlling the operation of said valve by the number of said articles in said receptacle.

6. In a device of the kind described, a container adapted to receive a plurality of similar articles and having a discharge opening at its bottom, a receptacle arranged to receive said articles escaping through said opening, and a rotatable member having a plurality of apertures at its periphery extending into said receptacle for regularly removing said articles from said receptacle, in combination with a valve for controlling said opening and means for controlling the operation of said valve by the amount of said articles in said receptacle.

7. In a disk feeding device of the kind described, a container adapted to receive a plurality of similar articles and having a discharge opening at its bottom and a receptacle arranged to receive said articles escaping through said opening, in combination with a pivotally mounted valve for controlling said opening and means for controlling the operation of said valve by the amount of said articles in said receptacle, comprising a member operatively connected with the valve, means for positively actuating said member, and means in the receptacle for moving said member into operative relation with the said actuating means.

8. In a disk feeding device of the kind described, a container adapted to receive a plurality of similar articles and having a discharge opening at its bottom and a receptacle arranged to receive said articles escaping through said opening, in combination with a valve for controlling said opening, a movable part for actuating said valve and means for controlling the operation of said valve by the number of said articles in said receptacle, comprising a member operatively connected with the valve, means for positively actuating said member to operate the valve and means in the receptacle for moving said member into operative relation with said actuating means upon the partial emptying of the receptacle.

9. In a device of the kind described, a container having a discharge opening at its bottom, a receptacle arranged to receive material escaping through said opening, and means for regularly removing material from said receptacle, in combination with a valve for controlling said opening, a movable part connected to said material-removing means for actuating said valve and means for controlling the operation of said valve by the amount of material in said receptacle.

10. In a disk feeding device of the kind described, a container adapted to receive a plurality of similar articles and having a discharge opening in its bottom, and a receptacle arranged to receive said articles escaping through said opening, in combination with a valve for controlling said opening and means extending into said receptacle for controlling the operation of said valve by the amount of said articles in said receptacle, and actuating means coöperating with said last mentioned means for positively operating the valve.

11. In a device of the kind described, a container adapted to receive a plurality of similar articles and having a discharge opening at its bottom, a receptacle having an inclined wall arranged to receive said articles escaping through said opening, and means for regularly removing said articles from said receptacle, in combination with a valve for controlling said opening and means coöperating with said inclined wall for controlling the operation of said valve by the number of said articles in said receptacle.

12. In a device of the kind described, a container adapted to receive a plurality of similar articles and having a discharge opening at its bottom, a receptacle arranged to receive said articles escaping through said opening, and means for regularly removing said articles from said receptacle, in combination with a pivotally mounted valve for controlling said opening and means for controlling the operation of said valve by the number of said articles in said receptacle.

13. In a device of the kind described, a container having a discharge opening at its bottom, a receptacle arranged to receive material escaping through said opening, and a rotatable member having a plurality of apertures at its periphery extending into said receptacle for regularly removing material from said receptacle, in combination with a valve for controlling said opening, a movable part connected to said material-removing means for actuating said valve and means for controlling the operation of said valve by the amount of material in said receptacle.

14. In a device of the kind described, a container adapted to receive a plurality of similar articles and having a discharge opening at its bottom, a receptacle arranged to receive said articles escaping through said opening, and means for regularly removing the articles from said receptacle, in combination with a pivotally mounted valve for controlling said opening, a movable part for actuating said valve and means for controlling the operation of said valve by the number of said articles in said receptacle.

15. In a device of the kind described, a container adapted to receive a plurality of similar articles and having a discharge opening at its bottom, a receptacle arranged to receive said articles escaping through said opening, and means for regularly removing said articles from said receptacle, in combination with a pivotally mounted valve for controlling said opening, a movable part for actuating said valve and means extending into said receptacle for controlling the operation of said valve by the amount of said articles in said receptacle.

16. In a device of the kind described, a container having a discharge opening at its bottom, a receptacle arranged to receive material escaping through said opening, a rotatable member having a plurality of apertures at its periphery extending into said receptacle for regularly removing material from said receptacle, in combination with a pivotally mounted valve for controlling said opening, a movable part connected to said material-removing means for actuating said valve, and means for controlling the operation of said valve by the amount of material in said receptacle.

17. In a device of the kind described, a container adapted to receive a plurality of similar articles and having a discharge opening at its bottom, mechanism at said bottom for regulating the discharge of said articles through said opening, a receptacle arranged to receive said articles escaping through said opening, and means for regularly removing said articles from said receptacle, in combination with a valve for controlling said opening and means for controlling the operation of said valve by the amount of said articles in said receptacle.

18. In a device of the kind described, a container having a discharge opening at its bottom, mechanism at said bottom for regulating the discharge of material through said opening, a receptacle arranged to receive material escaping through said opening and a rotatable member having a plurality of apertures at its periphery extending into said receptacle for regularly removing material from said receptacle, in combination with a pivotally mounted valve for controlling said opening, a movable part connected to said material-removing means for actuating said valve and means extending into said receptacle for controlling the operation of said valve by the amount of material in said receptacle.

19. A device of the kind described, comprising a conveyer adapted to move a succession of similar articles in a fixed path, a feed channel arranged to direct disk shaped pieces to said conveyer near the upper surface of said articles and regularly moving fingers each arranged to engage a piece when an article passes said channel and place said piece in position on said article, and means operated by said articles while being moved by the conveyer for controlling the feeding of said pieces to said engaging means, in combination with a feed box adapted to deliver said pieces to said channel and means for discharging said pieces into said feed box.

20. A device of the kind described comprising a conveyer adapted to move a succession of similar articles in a fixed path, a feed channel arranged to direct disk-shaped pieces to said conveyer near the upper surface of said articles and means for moving said pieces along said channel, means for engaging one of said pieces in said channel when an article passes said channel and placing said piece in position on said article, and means operated by said articles while being moved by the conveyer for controlling the feeding of said pieces to said engaging means, in combination with a feed box adapted to deliver said pieces one by one to said channel and means for discharging said pieces into said feed box.

21. A device of the kind described, comprising a conveyer adapted to move a succession of similar articles in a fixed path, a feed channel to direct pieces having a convex side to said conveyer near the upper end of said articles and means comprising a continuously moving bottom section for moving said pieces along said channel, moving fingers each arranged to engage a piece when an article passes said channel and placing said piece in position on said article, and means operated by said articles while being moved by the conveyer for controlling the feeding of said pieces to said engaging means, in combination with a feed box adapted to deliver said pieces to said channel one by one with their convex side upward and means for discharging said pieces into said feed box.

22. A device of the kind described, comprising a conveyer adapted to move a succession of similar articles in a fixed path, and a feed channel arranged to direct pieces having a convex side to said conveyer near the upper end of said articles, means for moving said pieces along said channel and means for engaging a piece when an article passes said channel and placing said piece in position on said article, and means operated by said articles while being moved by the conveyer for controlling the feeding of said pieces to said engaging means, in combination with a feed box adapted to deliver said pieces to said channel one by one each with its convex side upward and means for discharging said pieces into said feed box.

In testimony whereof I have hereunto signed my name in the presence of two subscribing witnesses.

CHARLES H. BIRCH.

Witnesses:
BURTON U. HILLS,
BLANCHE CHALMERS.